United States Patent
Mueller et al.

(10) Patent No.: US 7,775,454 B2
(45) Date of Patent: Aug. 17, 2010

(54) LOAD MANAGEMENT THERMOSTAT

(75) Inventors: Carl J. Mueller, St. Louis, MO (US);
John M. Sartain, St. Louis, MO (US);
James P. Garozzo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 727 days.

(21) Appl. No.: 11/801,855

(22) Filed: May 11, 2007

(65) Prior Publication Data

US 2008/0277487 A1 Nov. 13, 2008

(51) Int. Cl.
*G05D 23/00* (2006.01)
(52) U.S. Cl. .............................. 236/51; 236/1 C; 236/94
(58) Field of Classification Search .................. 236/1 C, 236/46 R, 51, 94; 700/276
See application file for complete search history.

(56) References Cited

U.S. PATENT DOCUMENTS

| | | | |
|---|---|---|---|
| 4,341,345 A | 7/1982 | Hammer et al. ........... 236/46 R |
| 4,389,577 A | 6/1983 | Anderson et al. ............ 307/39 |
| 4,881,686 A | 11/1989 | Mehta | |
| 6,480,803 B1 | 11/2002 | Pierret et al. | |
| 6,622,926 B1 | 9/2003 | Sartain et al. ................. 236/46 |
| 2004/0139038 A1* | 7/2004 | Ehlers et al. ................ 705/412 |
| 2005/0033707 A1* | 2/2005 | Ehlers et al. ................ 705/412 |
| 2006/0186213 A1* | 8/2006 | Carey et al. .................. 236/1 B |

OTHER PUBLICATIONS

PCT International Search Report regarding PCT/US 08/63180 dated Sep. 22, 2008 and Written Opinion of the International Searching Authority regarding PCT/US 08/63180 dated Sep. 22, 2008.
PCT International Preliminary Report on Patentability regarding PCT/US 08/63180 dated Nov. 17, 2009 and Written Opinion of the International Searching Authority regarding PCT/US 08/63180 dated Sep. 22, 2008.

\* cited by examiner

*Primary Examiner*—Cheryl J Tyler
*Assistant Examiner*—Paolo Gonzalez
(74) *Attorney, Agent, or Firm*—Harness, Dickey & Pierce, P.L.C

(57) ABSTRACT

A thermostat is provided that is capable of reliably reducing the operation of an air conditioner and other systems to provide energy cost savings to the consumer and load reduction to a utility provider. The thermostat includes at least one sensor configured to communicate information indicative of the temperature within the space, and a memory for storing at least one temperature offset value associated with a request for reduced heating or reduced cooling operation. The thermostat further includes a controller in communication with the at least one sensor, which is configured to periodically determine a temperature value for the space and to control heating or cooling of the space until the determined temperature value has substantially reached the set-point temperature. The periodically determined temperature value is in part based on information received from the at least one sensor, and may include at least one temperature offset value when a request for reduced operation has been received by the thermostat.

20 Claims, 5 Drawing Sheets

LOAD MANAGEMENT THERMOSTAT

This application claims priority to U.S. patent application Ser. No. 11/156,973, filed Jun. 20, 2005, entitled "Thermostat Having Default Curtailment Temperature Settings", which has been incorporated herein by reference.

FIELD

The present disclosure relates thermostats for controlling the level of operation of one or more systems to correspond with a time-of-use energy rate, and to thermostats that can provide demand side management control to an electric utility provider.

BACKGROUND

As the demand for electrical power increases during the day, the utility provider experiences an increase in the cost of generating electrical power as a result of secondary "peak" power plants that are switched on to supplement off-peak power generating plants. In situations where the peak demand begins to exceed the power generating capacity of the utility's off-peak and peak power plants, the utility may engage in demand side management, which curtails or reduces consumer energy usage to keep the demand from exceeding capacity. Utilities engaging in demand side management transmit a signal to various users of electrical energy to reduce the amount of energy they use during peak demand periods by turning off electrical loads such as air conditioners. In the example of an air conditioner controlled by a conventional thermostat, the utility provider may request reduced air conditioner operation by changing the set point temperature of the thermostat. Previous attempts have been made to provide a load-shedding thermostat that can offset the temperature set point to reduce the amount of energy used during peak demand periods. This would allow the utility to be able to lower energy consumption to keep the peak demand from exceeding their capacity, and the user would be able to save on their energy bill. However, this method of offsetting the temperature setting of a thermostat by a predetermined amount cannot always be relied upon to reduce the operating level of the air conditioner, since the user may respond to the displayed change in set point temperature by over-riding the utility change to the set-point temperature setting.

SUMMARY

The present disclosure relates to thermostats that provide load reduction features to reduce energy demand during peak energy consumption periods. Various embodiments of a thermostat are provided that are capable of reliably reducing the operation of an air conditioner and other systems to provide energy cost savings to the consumer and also load reduction to a utility provider. The various thermostat embodiments include at least one sensor configured to communicate information indicative of the temperature within the space, and a memory for storing at least one temperature offset value associated with a request for reduced heating or reduced cooling operation. The various thermostat embodiments further include a controller in communication with the at least one sensor, which is configured to periodically determine a temperature value for the space and to control heating or cooling of the space until the determined temperature value has substantially reached the set-point temperature. The periodically determined temperature value is in part based on information received from the at least one sensor, and may include at least one temperature offset value when a request for reduced operation has been received by the thermostat.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 shows a space temperature over a given time period in which one embodiment of a thermostat and method control air conditioner operation using an offset, in response to a first request for reduced operation;

FIG. 2. shows a space temperature over a given time period in which air conditioner operation is controlled using a second offset, in response to a second request for reduced operation;

DETAILED DESCRIPTION

Figure 1:
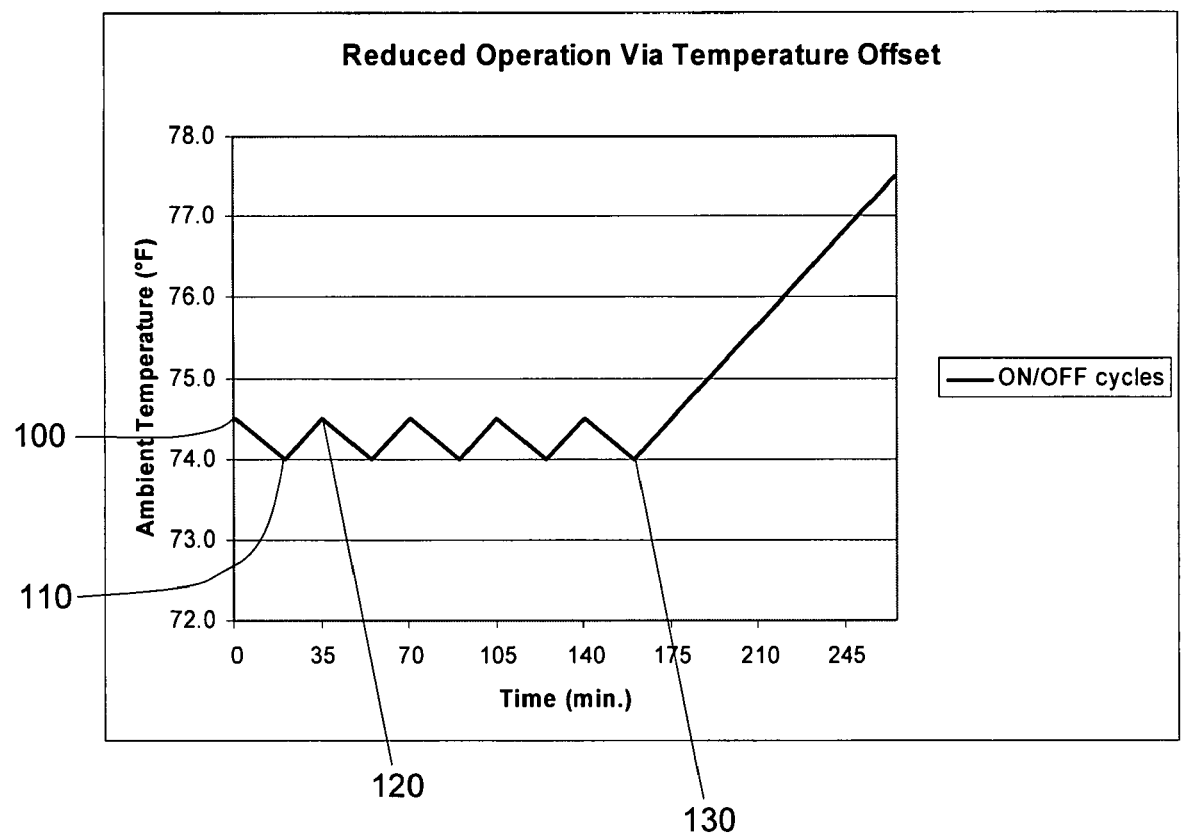

The following description is merely exemplary in nature and is not intended to limit the present disclosure, application, or uses. It should be understood that throughout the drawings, corresponding reference numerals indicate like or corresponding parts and features.

According to various aspects of the present disclosure, there are provided various exemplary embodiments of thermostat that includes a feature enabling a request for reduce cooling or heating operation. In the various embodiments, a thermostat is provided that is configured to hold or maintain a select set-point temperature setting. The various disclosed thermostat embodiments are at least configurable to operate in a "Hold" temperature mode, which controls cooling or heating to the space to hold or maintain the user's selected set-point temperature. In some embodiments, the thermostat may be configured to provide at least two or more programmed set-point temperature settings that correspond to specific time periods of operation, such as day or night time periods. In the "Hold" mode, the thermostat controls the operation of a heating or cooling system to continuously condition the space, to hold the space temperature at the user's select set-point temperature. If the space does not feel comfortable to the user, the various thermostat embodiments allow a user to temporarily adjust the "Hold" temperature setting by pressing the temperature up or down buttons, to request a higher or lower setting for a short time period. For example, the user may press the down arrow to lower the "Hold" temperature set-point of 72 degrees to 70 degrees Fahrenheit, in response to which a standard sub-routine within the thermostat's software program would control cooling to maintain the space at 70 degrees for a temporary two-hour time period, after which the thermostat would return to normal "Hold" mode to maintain the 72 degree set-point temperature.

The various embodiments of a thermostat further comprise at least one temperature responsive device that at least periodically outputs a variable or value that is indicative of the temperature in the space. The sensor may be any of a number of sensor types, and may comprise a crystal, oscillator or other electronic component having a frequency that responsively changes with temperature. Alternatively, the sensor may comprise a thermistor having a resistance value that changes in response to changes in temperature. The sensor could also be a device capable of communicating a voltage value that correlates to, or is indicative of, the temperature sensed in the space. The sensor may include circuitry to permit the sensor the communicate an absolute value of the temperature to a tenth of degree Fahrenheit. Likewise, the sensor may also include circuitry to enable communication of temperature information on a periodic basis, or upon request, such as when prompted by a microprocessor of the thermostat. Accordingly, the at least one sensor in the various embodiments is configured to sense and communicate information that is indicative of the temperature in the space.

The various embodiments of a thermostat further include a controller that is in communication with the at least one sensor. Since the sensed temperature varies over time, the controller is configured to periodically determine a temperature value for the space, which is stored as the current temperature value for the space. Each time the thermostat controller determines or updates the temperature value for the space, the controller uses information communicated from the at least one sensor in determining the space temperature value, which is then stored in a memory. The stored value may, for example, replace a previously stored space temperature value, or may be stored as part of a database of historical temperature values over time. Since the space temperature value varies over time and must be repeatedly determined by the controller, the controller may readily offset the determined temperature value prior to storing the space temperature value in memory. For example, the software associated with the thermostat's controller may, in its determination of the space temperature value, include an offset value when a certain condition is true (such as the receipt of a request for reduced heating or cooling operation within a predetermined time period). Such a software provision enables the changing of the space temperature value to effect a reduction in operation, without requiring software complexity or subroutines that are required to allow a utility provider to change the set-point temperature to reduce operation.

It should be noted that offsetting the space temperature is not the same as changing the thermostat's set-point temperature setting. If the thermostat's controller were configured to permit a Utility provider to temporarily change the thermostat's cooling set-point temperature, the thermostat would likely require a "load-shed" subroutine to deviate from normal operation and control cooling operation to the utility's changed set-point temperature for a temporary duration. The controller may also need to be configured to allow the user to override the utility provider's set-point and subsequently change the set-point temperature again, which would likely require another sub-routine for deviating from the previous "load-shed" subroutine. Changing the set-point temperature would therefore lead to greater software and controller costs.

For cost reasons, thermostats are designed to use programs of minimal size, with simple microprocessors having a limited memory. A software configuration that permits a utility provider to change the set-point temperature would require a sub-routine for deviating from normal operation, to enable interim control for a temporary time period using the Utility provider's changed set-point temperature (which change would also be displayed on the thermostat's display). This type of additional subroutine can add to the complexity and size of the software program, and may necessitate a more costly and sophisticated microprocessor to accommodate the size of the software, thereby increasing the thermostat's cost.

Moreover, permitting a utility provider to change the set-point temperature would be less effective in reducing operation to shed energy demand, since the user would readily see the Utility's change to the set-point temperature on the display of the thermostat, and would be more tempted to override the Utility's changed set-point. Thus, a set-point temperature change scheme accordingly requires the inclusion of subroutines that add to the software's complexity and the controller's memory requirements for the thermostat, and still would not adequately assure curbing of energy consumption through reduced heating or cooling operation.

The various embodiments of a thermostat do not alter the set-point temperature of the thermostat upon receiving a request for reduced heating or cooling operation. Rather, the various embodiments provide a thermostat that displays a current temperature value for the space (eg.—73° F., for example), and the set-point temperature (eg.—72° F., for example). In the above temperature situation, the thermostat would establish cooling operation to reduce the 73° F. temperature. Where a Utility provider's request for reduced cooling operation is received by the thermostat, the controller subsequently determines a space temperature value that includes, or is reduced by the at least one offset (eg.—to 70° F., for example), which artificially reduces the space temperature value relative to the unchanged set-point temperature. It should be noted that the temperature offset value is preferably within the range of 1 to 8 degrees Fahrenheit. Such an offset to the space temperature would thereby satisfy the set-point temperature and end cooling operation to thereby reduce the demand for energy. Thus, the displayed set-point temperature selected by the user remains unchanged, while the displayed space temperature is transparently lowered. As such, the user would perceive the space to be cooled to the user's selected set-point temperature. Such a configuration simplifies the use of load-shedding thermostat for the user, since the user would only see the display of the user's selected set-point temperature and the display of the determined temperature value for the space. Since this type of request for reduced operation would be transparent to the user (as the user's set-point temperature setting would remain unchanged), the user would be less likely to opt out, or over-ride the utility's request for reduced cooling operation. Accordingly, the various embodiments comprise a controller configured to periodically determine a space temperature value that can include at least one offset, to allow for effectively reducing heating or cooling operation where a request for reduced operation has been received (by a utility provider for example). The request for reduced operation is preferably a signal transmitted by a utility provider that is received by the thermostat, either wireless transmission means or through power-line transmission means. It should be noted that the request for reduced operation may also be an energy savings mode that the user may change from a normally disabled default setting to an enabled setting, such that the thermostat initiates reduced operation during "peak" energy demand periods at the user's request.

Such thermostat embodiments do not require any software subroutines for deviating from normal operation. The following description of one embodiment is given as an example to illustrate this advantageous feature.

In one embodiment, a load-shedding thermostat is provided for controlling the operation of at least a cooling system for conditioning a space. The thermostat comprises at least one sensor that is configured to communicate information indicative of the temperature within the space. In the first embodiment, the sensor produces a signal that increases in frequency with an increase in temperature, or a signal that increases in resistance with an increase in temperature. The sensor signal communicates information, or a value, that is indicative of the sensed temperature in the space, which value is received by a controller of the thermostat and converted to a temperature value.

The first embodiment of a thermostat further comprises a memory for storing at least one temperature offset value associated with at least one request for reduced cooling operation. The at least one offset value may be a value that incrementally changes with operating time, or may be a predetermined value associated with a particular degree of curtailment. Where a request has been received for reduced cooling (as opposed to reduced heating), the at least one temperature offset in the first embodiment comprises a offset value of −3 degrees Fahrenheit. The at least one temperature offset may further include a second offset of −3 degrees Fahrenheit, which may be associated with a tiered energy usage rate or a second request for additional reduced cooling operation, for example. Thus, the temperature offset value may comprise a plurality of incremental offset values that incrementally offset the space temperature to provide for reduced cooling in response to successive requests for reduced operation. The offset values are stored in a memory that is preferably a non-volatile electronically erasable programmable read-only memory (EEPROM). This memory may be a stand-alone memory component, but is preferably included in a microprocessor controller of the thermostat.

The first embodiment of a thermostat further includes a controller in communication with the at least one sensor, which controller is preferably a microprocessor that includes a software program for controlling the operation of at least a cooling system. The microprocessor controller is configured to periodically determine a temperature value for the space and to control cooling of the space until the determined space temperature value has substantially reached the set-point temperature. It should be noted that the controller may discontinue cooling operation when the space temperature value is within a fraction of a degree above or below the set-point temperature, rather than the exact moment that the set-point temperature is reached.

The microprocessor controller determines the temperature value for the space based on information received from the at least one sensor, and may include at least one temperature offset value in determining the space temperature value where a request for reduced operation has been received within a predetermined time period. The software associated with the thermostat's controller is configured to, in its determination of the space temperature value, include an offset value when a certain condition is true, such as where a request for reduced cooling operation has been received by the thermostat within a predetermined time period. It should be noted however, that similar programming means employed in software may also be used, which are suitable for providing a conditional offset to a determined value. The thermostat further comprises a display device that displays to the user the set-point temperature, and the determined temperature value for the space, without any indication of whether the temperature value for the space includes a temperature offset value.

Where a request for reduced operation has been received within a predetermined time period, the controller includes at least one temperature offset value in determining the space temperature value. The predetermined time period may comprise a three hour period, for example, which would allow a utility provider to communicate a signal to request reduced cooling operation that would remain in effect for three hours. During this predetermined time period, the thermostat's microprocessor controller would continue to offset the determined temperature value for the space. The offset would artificially lower the space temperature value, such that the set-point temperature is either satisfied or more quickly reached, to thereby reduce the need for cooling operation.

For example, in the situation of a thermostat with a user-selected set-point temperature of 72 degrees Fahrenheit, in a space that is at 73 degrees Fahrenheit, the thermostat would control the operation of the cooling system to lower the space temperature to 72 degrees. Upon receiving a request for reduced operation (from either a Utility provider or the user of the thermostat), the thermostat's controller would offset the space temperature value by −3 degrees, to 70 degrees Fahrenheit. Since the 70 degree space temperature value is below the 72 degree set-point temperature value, the thermostat controller would discontinue cooling operation. The cooling system would remain off for a substantial time period, until the 70 degree space temperature value slowly rises above the 70 degree set-point temperature. This would have the effect of reducing the operation of the cooling system, to thereby reduce energy demand on the utility provider.

During the predetermined time period, the controller may be configured (by a Utility provider, for example) to discontinue cooling operation for at least a minimum off-time period after the space temperature value has substantially reached the set-point temperature, to thereby provide a minimum off time that will further reduce operation of the cooling system after the initial offset. After the predetermined time period has transpired, the controller is configured to subsequently determine a space temperature value that is absent any temperature offset value, since the request for reduced operation received by the thermostat is no longer within the predetermined time period. Thus, the request for reduced operation is discontinued after the predetermined timed period following the receipt of the request has transpired. At such point, the thermostat returns to normal operation of maintaining the 72 degree set point temperature.

In the first embodiment of a thermostat, the displayed 72 degree set-point temperature selected by the user remains unchanged, while the displayed space temperature is transparently lowered to 70 degrees. As such, the user would perceive the space to be cooled to the user's 72 degree set-point temperature. Since this type of request for reduced operation would be transparent to the user, the user would be less likely to over-ride the utility's request for reduced cooling operation, through adjustment of the temperature. Accordingly, the first embodiment of a thermostat provides for effectively reducing cooling operation where a request for reduced operation has been received from a Utility provider, or alternatively a user of the thermostat. However, should an occupant of the space feel uncomfortable, the occupant may temporarily adjust the "Hold" set-point temperature setting by pressing the temperature up or down buttons, to request a higher or lower setting for a short time period. For example, an occupant or user may press the down arrow to lower the "Hold" temperature set-point of 72 degrees to 70 degrees Fahrenheit, in response to which a standard sub-routine within the thermostat's software program would control cooling to maintain the space at 70 degrees for a temporary two-hour time period. No additional software subroutines would therefore be required to over-ride the utility's request for "load-shed" or reduced operation. As such, a thermostat is provided with load-shedding and over-ride capability that does not require software complexity or more costly sophisticated microprocessor control.

For purposes of illustration only, the operation of an air conditioner may be controlled by a thermostat and method according to the first embodiment as described in the following exemplary scenario. Referring to FIG. 1, a chart is provided illustrating the temperature of a space over a given time period, during which the thermostat successively initiates operation of the air conditioner. For illustrative purposes, the scenario assumes a conditioned space that experiences an increase of 2 degrees Fahrenheit per hour during the daytime when outside ambient temperatures reach their peak.

Referring to FIG. 1 at 100, the thermostat determines that the calculated temperature value for the space is at least 0.5 degrees Fahrenheit above a 74 degree set-point temperature, and initiates operation of the air conditioner. The air conditioner runs for approximately 20 minutes, after which the thermostat's determined temperature value for the space is 74 degrees, and the air conditioner is shut off at 110. During the next 15 minutes, the temperature in the space gradually increases at a rate of 2 degrees Fahrenheit per hour, and reaches 74.5 degrees Fahrenheit at 120. The thermostat responsively initiates operation of the air conditioner in a cyclic manner, up to point 130. At 130, the thermostat then receives a request for reduced operation, from an occupant or a Utility provider for example. The thermostat then calculates a determined temperature value for the space, which is determined based on information received from the at least one sensor, and at least one temperature offset value associated with a request for reduced operation. In this illustrative example, the temperature offset is −3 degrees Fahrenheit. The determined temperature value for the space is then 74 less 3 degrees, or 71 degrees. Accordingly, the thermostat would compare the determined temperature value for the space of 71 degrees Fahrenheit relative to the 74 degree set point temperature. The thermostat would accordingly maintain the air conditioner in an off state as the actual temperature gradually increases to an actual temperature of 77.5 degrees Fahrenheit, or a determined temperature value of 77.4 degrees, after which the thermostat would again initiate operation of the air conditioner in a cyclic manner. This would result in a total "off" time of an hour and forty-five minutes in which energy would be saved during a peak temperature or energy demand period. It should be noted that in the various disclosed embodiments, the thermostat may alternatively be configured to determine temperature values in degrees Celsius, and may include offset values that are also in degrees Celsius.

In another illustration, a second request for curtailment of air conditioning operation is further described in the following exemplary scenario shown in FIG. 2, which shows a chart illustrating the temperature of a space over a given time period. The conditioned space similarly experiences an increase of 2 degrees Fahrenheit per hour as above, and has received a previous request for reduced operation that led to a −3 degree temperature offset.

Figure 2:
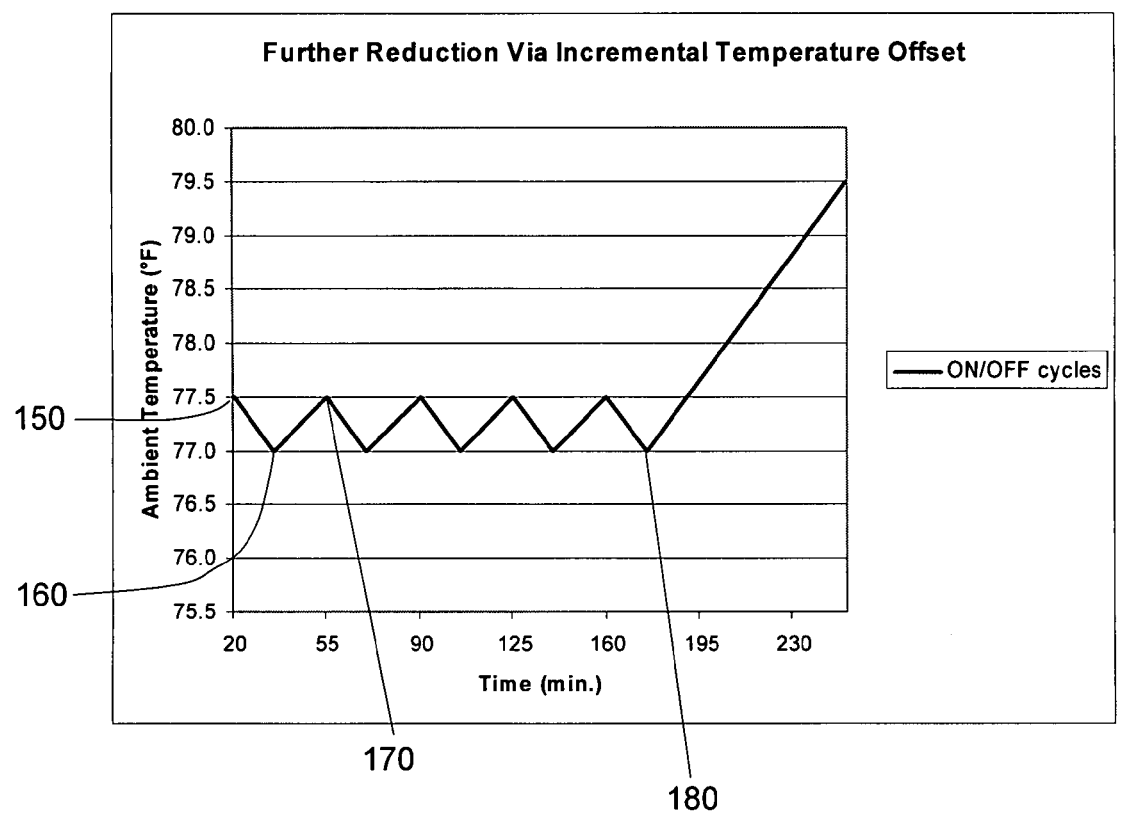

Referring to FIG. 2 at 150, the thermostat continues operation leaving off after the end of the above scenario. The thermostat calculates a determined temperature value for the space as 77.5 degrees Fahrenheit, less a 3 degree offset, to reach 74.5 degrees Fahrenheit. This determined temperature for the space is at least 0.5 degrees Fahrenheit above the 74 degree set-point temperature, such that the thermostat initiates operation of the air conditioner. The air conditioner runs for approximately 20 minutes, after which the thermostat's determined temperature value for the space is 74 degrees, and the air conditioner is shut off at 160. During the next 15 minutes, the temperature in the space gradually increases at a rate of 2 degrees Fahrenheit per hour, and reaches an actual temperature of 77.5 degrees Fahrenheit, or a determined temperature for the space of 77.4 degrees Fahrenheit. At 170, the thermostat responsively initiates operation of the air conditioner in a cyclic manner, up to point 180. At 180, the thermostat then receives a subsequent request for further reduction in operation, such as during a critical peak demand period. The thermostat then calculates a determined temperature value for the space, which is determined based on information received from the at least one sensor, and a temperature offset value associated with a second request for reduced operation. In this illustrative example, the temperature offset is −5 degrees Fahrenheit. The determined temperature value for the space is then 77 less 5 degrees, or 72 degrees. Accordingly, the thermostat would compare the determined temperature value for the space of 72 degrees Fahrenheit relative to the 74 degree set point temperature. The thermostat would accordingly maintain the air conditioner in an off state as the actual temperature gradually increases to 79.5 degrees Fahrenheit, after which the thermostat would again initiate operation of the air conditioner in a cyclic manner. This would result in an additional "off" time of an hour and fifteen minutes beyond the first hour and forty-five minute period, in which period energy would be saved during a peak temperature or energy-demand period of the day.

The above incremental offsets to the space temperature both artificially allow the thermostat to satisfy the set-point temperature and end cooling operation to thereby reduce the demand for energy. The displayed set-point temperature of 74 degrees remains unchanged, while the displayed space temperature is transparently lowered. As such, the user would perceive the space to be cooled to the desired set-point temperature, and the request for reduced operation would be transparent to the user (as the user's set-point temperature setting would remain unchanged). Accordingly, the user would be less likely to over-ride a request for reduced cooling operation, and would still have a sufficiently cool temperature for the space relative to peak outside ambient temperatures.

In another aspect of the present disclosure, a method is provided for controlling the operation of a thermostat that is capable of receiving a request for reduced operation of a heating or cooling system for a space, such as during a period of peak energy demand. In one embodiment, the method comprises storing in a memory at least one temperature offset value associated with a request for reduced cooling operation. The method further comprises the steps of receiving the communication of information indicative of the temperature within a space from at least one sensor, and periodically determining a temperature value for the space. The periodic determination of a temperature value is determined based on information received from the at least one sensor, and at least one temperature offset value when a request for reduced operation has been received within a predetermined time period. The method then controls operation of the heating or cooling system for the space until the determined temperature value has substantially reached the set-point temperature. The method preferably includes the at least one temperature offset value in the determination of a temperature value for the space for a predetermined time period after a request for reduced heating or cooling operation has been received.

Figure 3:
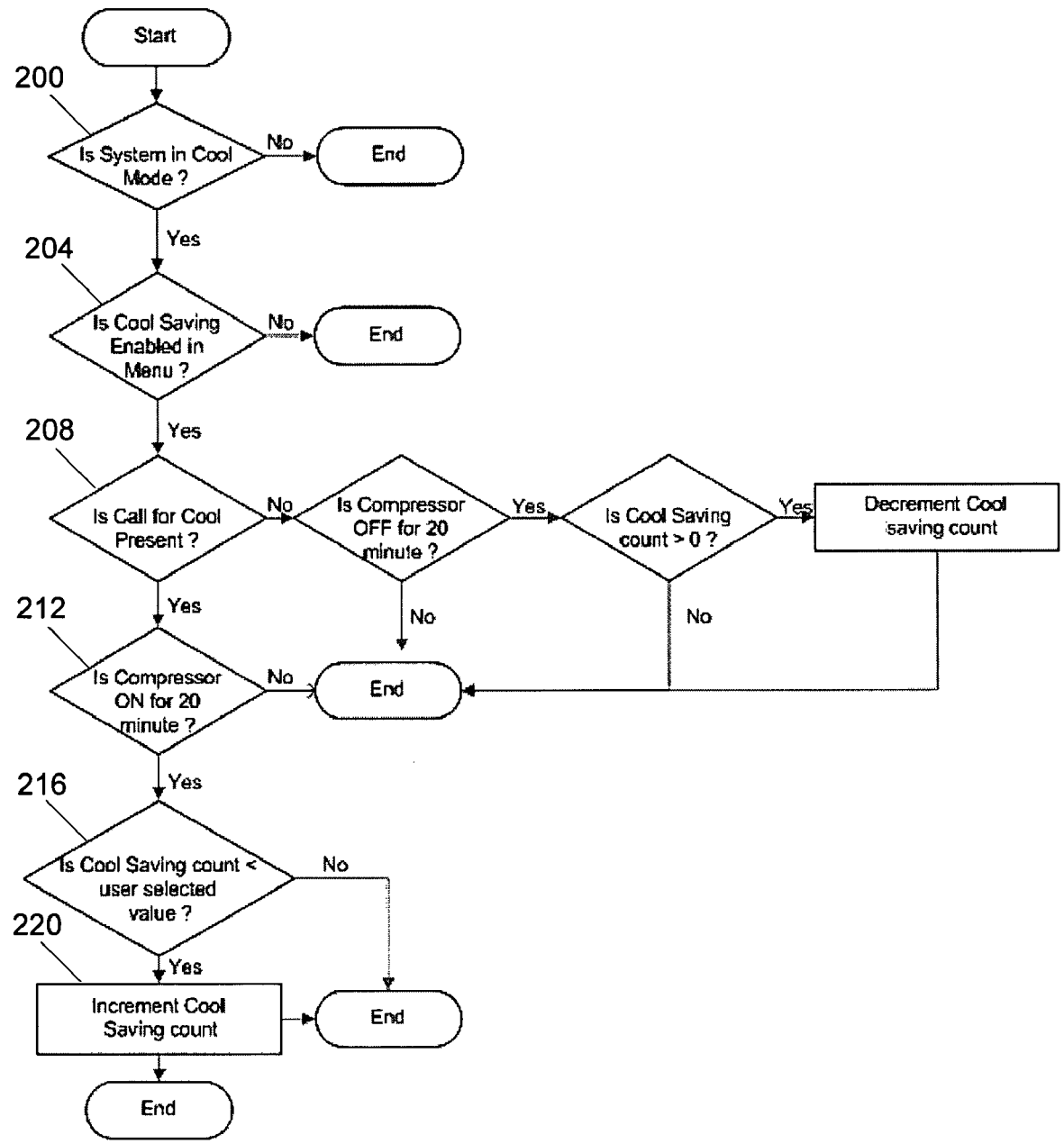
FIG. 3 shows a flow chart for a second embodiment of a thermostat and method according to the principles of the present disclosure.

It should be noted that other embodiments of a system and method may be employed that comprise a number of offset values, where the offset value varies or is incrementally changed with operating time, for example. Referring to FIG. 3, an example of a second embodiment of an energy saving method for controlling a thermostat is illustrated. In this method, the offset value is incremented based on the operating time of the air conditioner.

Not shown in FIG. 3 are the initial steps of the second method embodiment, of storing in a memory at least one temperature offset default value associated with a request for reduced cooling operation. The method also periodically receives the communication of information indicative of the sensed temperature within a space from at least one sensor. The method also determines a temperature value for the space, based on information received from the at least one sensor and at least one temperature offset value when a request for reduced operation has been received within a predetermined time period.

Referring to FIG. 3 at step 200, the second embodiment of a method for controlling a thermostat determines whether the system is in a cool mode in which the air conditioning system is to be operated to control the temperature of a space. The method then determines at step 204 whether it is in a normal mode of operation to control a space temperature, or whether it is in an energy savings mode of reduced operation (eg.— Cool Savings mode). If the thermostat is in the reduced operation mode, the thermostat proceeds to step 208 to compare the determined temperature value for the space is above the determined set point temperature, to determine if there is a call for cooling operation. If there is a call or need for cooling, operation of the air conditioner is initiated. The method of this embodiment uses a compressor run-time counter for tracking the amount of time the compressor runs, and determines at step 212 whether the compressor has run beyond a predetermined time, such as 20 minutes, for example. For a given number of minutes beyond the twenty minute operating time, the software increments a count value at step 220 (up to a user specified maximum set at step 216), which count value may be used in determining an offset value in the calculation of a determined temperature for the space. The offset value may be incremented by a predetermined temperature value corresponding to an incremental time period of operation beyond a minimum threshold time period of operation. For example, the offset may be incremented at least $1/16$ of a degree Fahrenheit for each two-minute time increment of operation beyond a minimum threshold period of at least 15 minutes of operation. The offset value may initially be a default value of 0 degrees, and may be incremented $1/16$ of a degree for every two minutes that the compressor runs beyond twenty minutes in a given cooling cycle. Thus, if the compressor runs for a total of 24 minutes before the set-point temperature is reached, the offset would be 2 degrees plus $2/16$ of a degree, or $2\frac{1}{8}$ degree Fahrenheit. Thus, the longer the compressor runs during cooling operation cycles, the greater will be the offset that is subtracted from the sensed temperature in calculating a determined temperature value for the space. Thus, the determined temperature for the space will be decremented over longer compressor run times, such that the set point temperature is reached sooner and compressor operation is shortened. During midday when daytime temperatures reach their peak, the air conditioner is less effective and runs longer to cool the space. It is during such periods that longer run times of the air conditioning compressor will occur. The present method curtails operation of the air conditioner during such periods by offsetting the temperature value for the space to help reach the set point temperature sooner and reduce air conditioning operation. This method accordingly helps to reduce cooling operation during peak energy demand periods.

Figure 4:
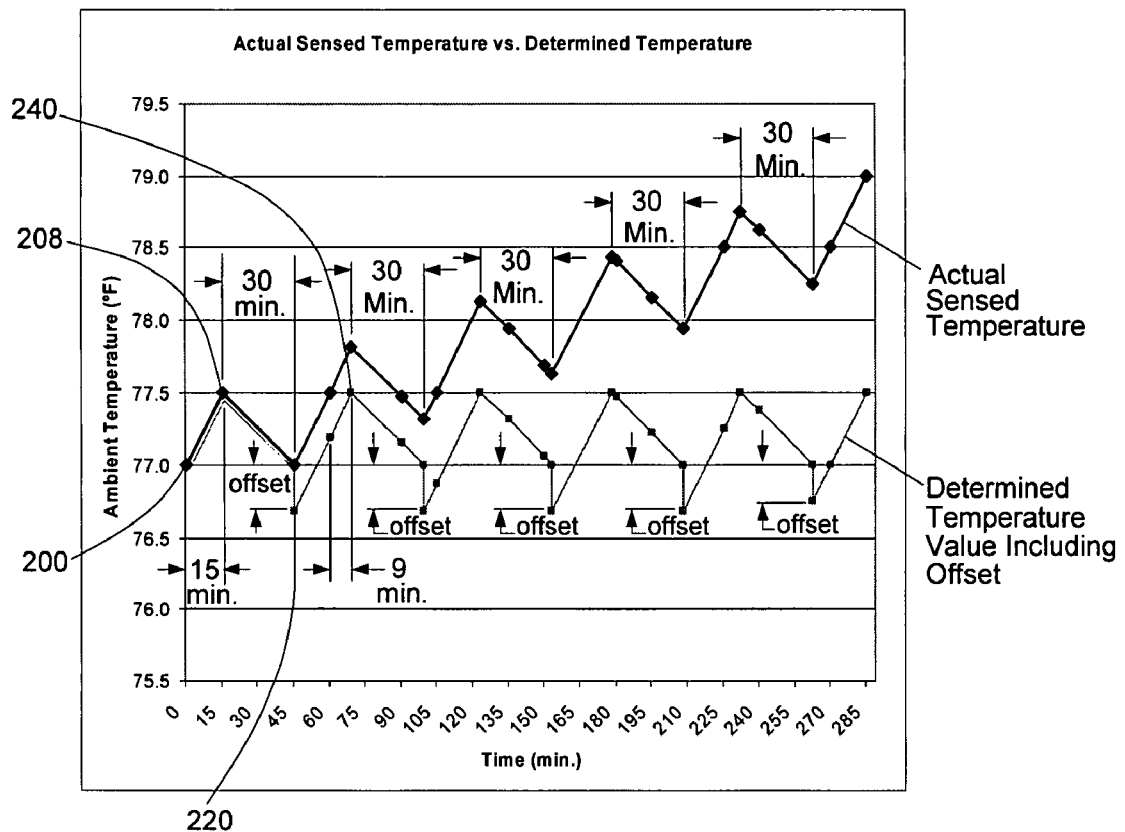
FIG. 4 shows an illustration of a temperature profile provided by another embodiment of a thermostat and method according to the principles of the present invention.

Referring to FIG. 4, an illustration of a temperature profile that may be provided by the above method is shown. A thermostat utilizing the above method is set to a cool mode for conditioning a space, which is initially at 77 degrees Fahrenheit as shown at 200. In this illustration, the outdoor ambient temperature is assumed to be high, such that the space experiences a 2 degree increase per hour, or a 0.5 degree Fahrenheit increase to 74.5 degrees in 15 minutes. At 208, the control method for the thermostat determines if there is a call for cooling operation, by checking temperature sensor information and calculating a determined temperature value for the space of 77.5 degrees. Since the 77.5 degree determined temperature value is at least 0.5 degrees above a 77 degree set-point temperature, the thermostat establishes operation of the air conditioner. Because of the high outside ambient conditions, the air conditioner runs for as much as 30 minutes before the space is cooled to a level where the determined temperature value for the space is at the 77 degree set point temperature, and operation of the air conditioner is discontinued or shut-off. Since the air conditioner was operated for more than 20 minutes, the method increments a count value during operation after 20 minutes, which value may be used to determine an offset value. For example, the offset value may initially be a default of 0 degrees, and may be incremented $1/16$ of a degree for every two minutes that the compressor runs beyond twenty minutes in a given cooling cycle. Thus, the 10 minutes of operation beyond the 20 minute period would result in an offset of $5/16$ of a degree Fahrenheit. At the conclusion of the cooling cycle, the thermostat may calculate a determined temperature value of the space that includes this $5/16$ offset, to arrive at a new determined temperature value of $76^{11}/_{16}$ degrees Fahrenheit at 220.

From point 220, the determined temperature value of the space would again rise in the next 15 minutes by 0.5 degrees, from $76^{11}/_{16}$ degrees to $77^{3}/_{16}$ degrees. After 15 minutes, the determined temperature has not reached the 77.5 degree trigger point, because of the offset value. Thus, the air conditioner will remain off for another 9 minutes before the determined temperature value increases from $77^{3}/_{16}$ degrees to the $77\frac{1}{2}$ degree trigger point at 240. Thus, the offset causes the air conditioner off time to increase from 15 minutes to 24 minutes. Once the determined temperature value reaches 77.5 degrees, the thermostat will again establish operation of the air conditioner, which will again run for 30 minutes to cool the space until the determined temperature value is lowered to 77 degrees. The method would again increment the offset value $1/16$ of a degree for every two minutes of operation beyond twenty minutes in the cooling cycle, to result in a total offset value of $10/16$ of a degree Fahrenheit. This method of offsetting the sensed temperature for the space is repeated over five 30-minute cooling cycles, after which a predetermined maximum temperature offset is reached, which in this embodiment is $1\frac{1}{2}$ degrees. In the 280 minute time period in which the air conditioner was operated for five 30-minute cycles, the air conditioner remained off after each cycle for a period of 24 minutes instead of only 15 minutes. This resulted in 45 minutes of additional off time, in exchange for an increase of only 1.5 degrees in the actual sensed temperature for the space.

Figure 5:
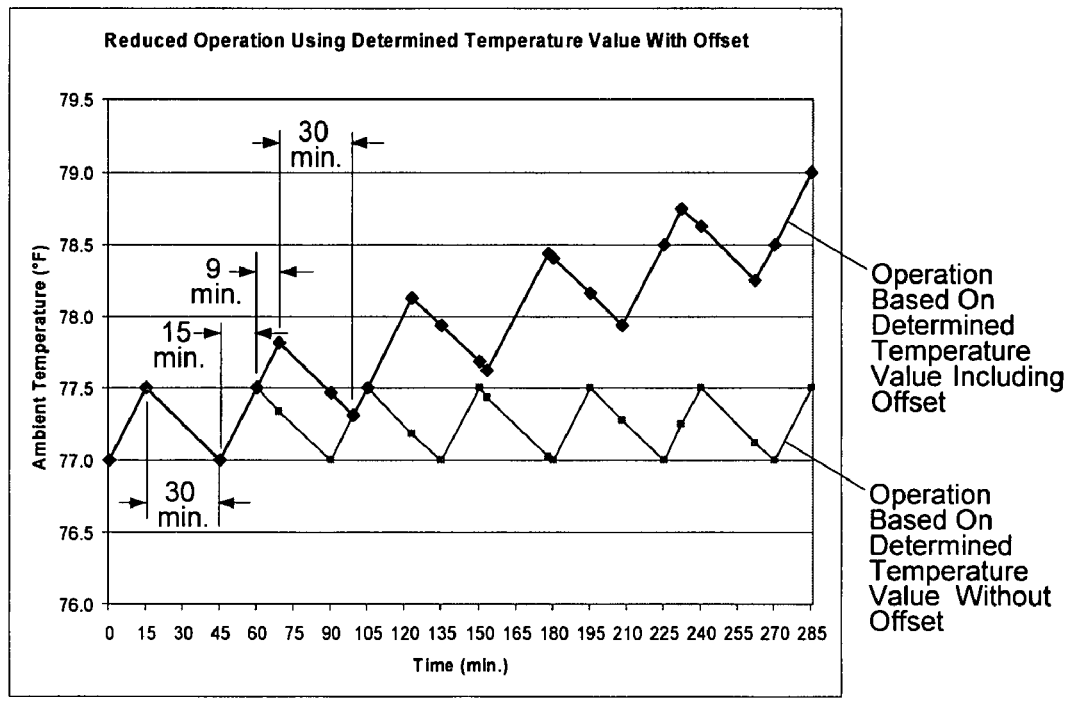
FIG. 5 shows a graph illustrating the reduced operation of an air conditioner system using a determined temperature value including an offset.

Referring to FIG. 5, the above method for controlling operation based on a determined temperature value including an offset provided five 30-minute cycles in a time period that would normally have six 30-minute cycles based on a determined temperature absent any offset. Thus, in mid-day peak-energy demand situations when elevated outside ambient temperatures cause air conditioners to run for longer cycle periods, the above method results in a reduction in operation of 17 percent. In such a method, the request for reduced operation may implemented simply by a utility-provider signal to enter the thermostat into the incremental offset mode of operation, or by the user setting the thermostat to the incremental mode of operation. Thus, a user may be able to initiate the request for reduced mode of operation, independent of any signal from a utility provider. Moreover, the thermostat provides for such reduced operation only during day time periods in which elevated temperatures cause the air conditioner to run longer cycles, and therefore selectively reduces operation based on outside ambient temperatures that affect peak energy demand periods, without requiring the use of any outside ambient temperature sensor.

Figure 6:
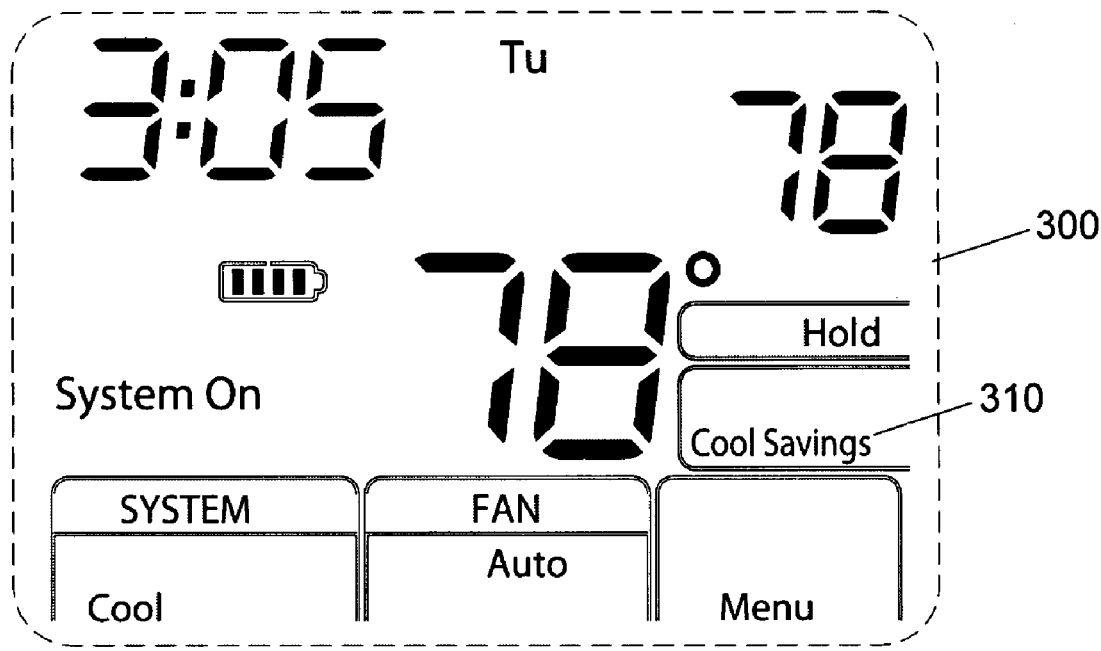
FIG. 6 shows an embodiment of a thermostat provided with a display device configured to display an icon indicating that the thermostat has been selectively set to the reduced mode of operation.
Figure 7:
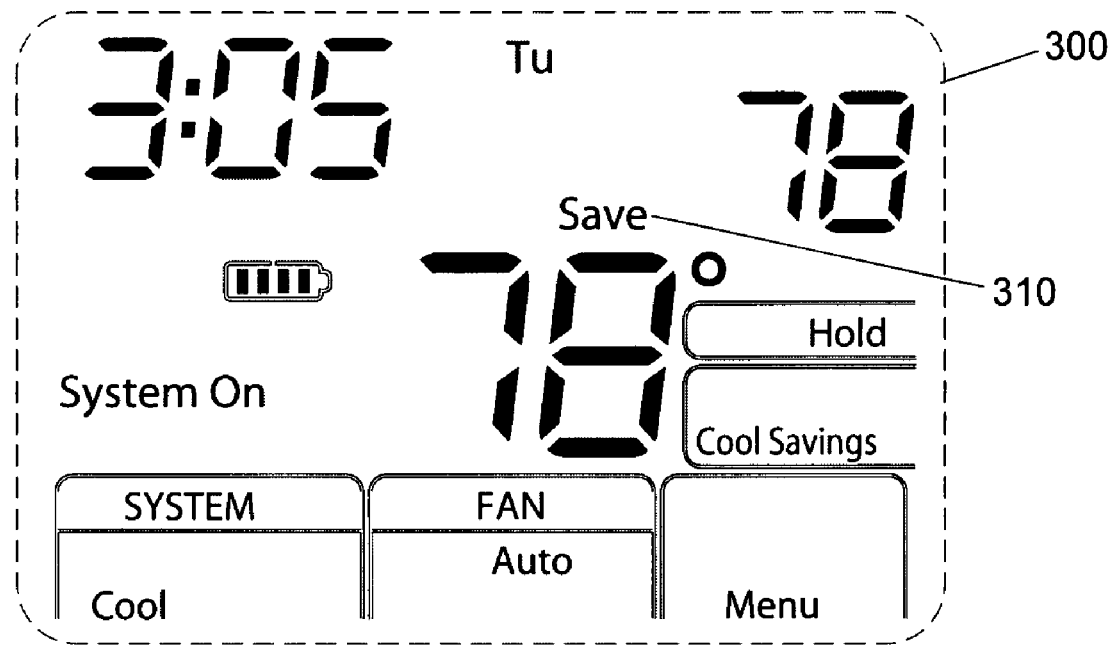
FIG. 7 shows an embodiment of a thermostat provided with a display device configured to display an icon indicating that the thermostat is in a reduced mode of operation.

In another aspect of the present disclosure, the thermostat is further provided with a display device 300 as shown in FIG. 6, which is configured to display an icon 310 indicating that the thermostat is in the reduced mode of operation. For example, the display may show the words "Cool Savings" to indicate that the reduced operation mode has been selected or enabled. Referring to FIG. 7, the thermostat display device 300 has been further configured to display an Icon 320 to indicate when the thermostat has received a request for reduced operation. For example, the display device may show the word "Save" to indicate that the thermostat is controlling operation using the determined temperature value for the space to reduce air conditioner operation. In this manner, the reduced mode of operation is transparent, since the displayed set point temperature setting and displayed "determined temperature value" still appear the same. The "Save" icon provides an inconspicuous indication that air conditioning operation has been curtailed, in a manner that will not alert all occupants of the space to avoid the temptation by such occupants to override the temperature setting.

The advantages of the above described embodiments and improvements should be readily apparent to one skilled in the art, as to enabling load-shedding capability to a thermostat. Additional design considerations may be incorporated without departing from the spirit and scope of the invention. The description in this disclosure is merely exemplary in nature and, thus, variations are not to be regarded as a departure from the spirit and scope of the disclosure. Accordingly, it is not intended that the invention be limited by the particular embodiments or forms described above, but by the appended claims.

What is claimed is:

1. A thermostat for controlling a heating and/or cooling appliance for a space to maintain a set-point temperature, the thermostat comprising:
   at least one sensor configured to communicate information indicative of the temperature within the space;
   a memory for storing at least one sensed temperature offset value associated with a request for reduced heating or reduced cooling operation received via a signal from a utility provider; and
   a controller in communication with the memory and the at least one sensor, being configured to receive a signal from a utility provider that includes a request for reduced operation, and to periodically receive a sensed temperature value from the at least one sensor, where the controller offsets the sensed temperature value by the at least one sensed temperature offset value associated with a request for reduced operation, when a request for reduced operation from a utility provider has been received, to thereby determine an artificial temperature value for the space, the controller being configured to discontinue cooling operation for the space where the determined artificial temperature value is below the set-point temperature; and
   a display device in communication with the controller that displays the determined artificial temperature value for the space instead of the actual sensed temperature of the space, and also displays the user selected set point temperature without alteration, such that the alteration of the sensed temperature for the space is transparent to the user and the user would be less likely to over-ride a request for reduced cooling operation by changing the user's setpoint temperature.

2. The thermostat of claim 1 where upon receiving a request for reduced heating or cooling operation, the controller is configured to include at least one temperature offset value in the determination of the artificial temperature value for the space for a predetermined time period after receiving the request for reduced heating or cooling operation.

3. The thermostat of claim 2 where the controller is configured to periodically determine an artificial temperature value for the space absent any temperature offset value where the controller has not received a request for reduced operation within the predetermined time period, such that reduced operation is discontinued after expiration of the predetermined timed period.

4. The thermostat of claim 1 further comprising a display device that displays to the user the set-point temperature and the periodically determined artificial temperature value for the space, without any indication that the displayed artificial temperature value for the space includes a temperature offset value.

5. The thermostat of claim 1 wherein the set-point temperature is a temperature setting selected by the user that the thermostat uses and controls cooling operation to hold the temperature in the space.

6. The thermostat of claim 1 wherein the thermostat is programmable to include at least two programmed set point temperature settings associated with specific time periods of operation.

7. The thermostat of claim 2 wherein the offset value is in the range of 1 to 8 degrees.

8. The thermostat of claim 1 wherein the at least one temperature offset value comprises a plurality of incrementally varying offset values.

9. The thermostat of claim 1 wherein during the predetermined time period, the controller is further configured to discontinue heating or cooling operation for at least a minimum off-time period after the determined artificial temperature value has substantially reached the set-point temperature.

10. A thermostat for controlling at least a cooling system for conditioning a space, the thermostat comprising:
    at least one sensor configured to communicate information indicative of the temperature within the space;
    a memory for storing at least one sensed temperature offset value associated with a request for reduced cooling operation received via a signal from a utility provider; and
    a controller in communication with the memory and the at least one sensor, being configured to periodically receive a sensed temperature value from the at least one sensor and to receive a signal from a utility provider that includes a request for reduced operation, where the controller offsets the sensed temperature value by at least one sensed temperature offset value associated with a request for reduced operation, when a request for reduced operation from a utility provider has been received, to thereby determine an artificial temperature value for the space, the controller being configured to discontinue cooling operation for the space where the determined artificial temperature value is below the set-point temperature; and a display device in communication with the controller that displays the determined artificial temperature value for the space instead of the actual sensed temperature of the space, and also displays the user selected set point temperature without alteration, such that the alteration of the sensed temperature for the space is transparent to the user and the user would be less likely to over-ride a request for reduced cooling operation by changing the user's setpoint temperature.

11. The thermostat of claim 10 where upon receiving a request for reduced heating or cooling operation, the controller is configured to include at least one temperature offset value in the determination of the artificial temperature value for the space for a predetermined time period after receiving the request for reduced heating or cooling operation.

12. The thermostat of claim 11 where the controller is configured to periodically determine an artificial temperature value for the space absent any temperature offset value where the controller has not received a request for reduced operation within the predetermined time period, such that reduced operation is discontinued after expiration of the predetermined timed period.

13. The thermostat of claim 10 further comprising a display device that displays to the user the set-point temperature and the periodically determined artificial temperature value for the space, without any indication that the periodically determined temperature value for the space includes a temperature offset value.

14. The thermostat of claim 10 wherein the offset value is in the range of 1 to 8 degrees.

15. The thermostat of claim 10 wherein the offset is incremented by a predetermined temperature value corresponding to an incremental time period of operation beyond a minimum threshold time period of operation.

16. The thermostat of claim 15, wherein the offset is incremented at least 1/16 of a degree Fahrenheit for each individual time increment beyond a minimum threshold period of at least 15 minutes of operation.

17. The thermostat of claim 10 wherein the thermostat is programmable to include at least two programmed set point temperature settings associated with specific time periods of operation.

18. The thermostat of claim 11 wherein during the predetermined time period, the controller is further configured to discontinue heating or cooling operation for at least a minimum off-time period after the determined artificial temperature value has substantially reached the set-point temperature.

19. A method for controlling the operation of a thermostat capable of receiving a request for reduced operation of a heating or cooling system for a space, comprising:

storing in a memory at least one temperature offset value associated with a request for reduced cooling operation received via a signal from a utility provider;

receiving the communication of information indicative of the sensed temperature within a space from at least one sensor; and periodically determining an artificial temperature value for the space, wherein the artificial temperature value is determined based on sensed temperature value information received from the at least one sensor, which is offset by at least one sensed temperature offset value associated with a request for reduced operation, when a request for reduced operation has been received from a utility provider within a predetermined time period; and controlling operation of the heating or cooling system for the space to discontinue cooling operation when the determined artificial temperature value is below the set-point temperature; and displaying on a display device the determined artificial temperature value for the space instead of the actual sensed temperature of the space, and further displaying the user selected set point temperature without any alteration, such that the alteration of the sensed temperature for the space is transparent to the user and the user would be less likely to over-ride a request for reduced cooling operation by changing the user's selected setpoint temperature.

20. The method of claim 19 wherein the at least one temperature offset value is added to the sensed temperature value in the determination of an artificial temperature value for the space for a predetermined time period after a request for reduced heating or cooling operation has been received.

* * * * *